(No Model.)
W. KIRKPATRICK.
EGG TESTER.
No. 317,462.        Patented May 5, 1885.
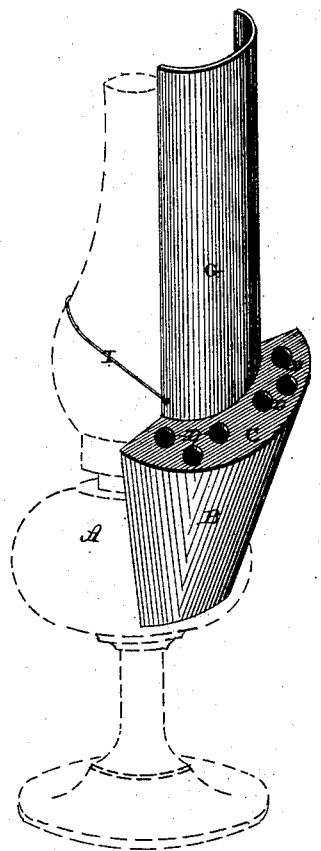
Witnesses —
L. F. Gardner
L. L. Burket.
Inventor —
W. Kirkpatrick,
per
F. A. Lehmann,
Atty.

UNITED STATES PATENT OFFICE.

WALLACE KIRKPATRICK, OF ANNA, ILLINOIS.

EGG-TESTER.

SPECIFICATION forming part of Letters Patent No. 317,462, dated May 5, 1885.

Application filed March 17, 1885. (No model.)

*To all whom it may concern:*

Be it known that I, WALLACE KIRKPATRICK, of Anna, in the county of Union and State of Illinois, have invented certain new and useful Improvements in Egg-Testers; and I do hereby declare the following to be a full, clear, and exact description of the invention, such as will enable others skilled in the art to which it pertains to make and use it, reference being had to the accompanying drawing, which forms a part of this specification.

My invention relates to improvements in egg-testers; and it consists in the combination of a lamp or other source of light, a wire which is loosely attached to the tester, and which is to be passed down over the lamp-chimney, for the purpose of supporting the tester in position, with the tester, which is made with a suitable shoulder, through which the perforations for the eggs are made, as will be more fully described hereinafter.

The object of my invention is to produce a tester which can be applied to any lamp, and which will support the egg being tested just above or opposite the flame, so that light will be applied directly to the lower ends of the eggs.

The accompanying drawing represents a perspective of a tester embodying my invention.

A represents an ordinary lamp or other source of light, to which the tester is applied. This tester consists of a circular lower portion, B, upon the top of which is formed a suitable shoulder, C, through which are made any suitable number of perforations, D, into which the ends of the eggs being tested are placed. This lower portion is made circular, so as to conform to the shape of the lamp-bowl, and thus support the tester evenly in position, and at the same time act as a reflector to throw the light upward, so that it will pass through the eggs. The outer portion of the tester is formed of a curved part, G, which extends any suitable distance upward along the chimney, and which also serves to balance the tester in position, and to serve as a shield to prevent the light from the lamp striking against the upper portion of the eggs. This tester is supported in position by means of a wire loop or bail, I, which is passed around the side of the lamp-chimney, as shown. The eggs have one of their ends passed through the perforations in the shoulder, and the light being thrown directly against them enables a person to see at a glance what the condition of the egg is.

Having thus described my invention, I claim—

In an egg-tester, the combination of a wire loop or support with the tester, consisting of a lower portion, having a perforated shoulder upon its top, and the upper portion or shield, which extends along the side of the chimney, substantially as shown and described.

In testimony whereof I affix my signature in presence of two witnesses.

WALLACE KIRKPATRICK.

Witnesses:
ROBERT HAMILTON,
A. J. HUNSAPER.